2,770,639

METHOD OF PRODUCING ALIPHATIC AND ALICYCLIC CARBONATES

Robert J. Slocombe, Dayton, Ohio, and Edgar E. Hardy and James H. Saunders, Anniston, Ala., assignors to Monsanto Chemical Company, St. Louis, Mo., a corporation of Delaware No Drawing. Application January 17, 1955, Serial No. 482,422

10 Claims. (Cl. 260—463)

The present invention relates to aliphatic and alicyclic carbonates and to a novel method of producing same.

One object of the invention is to provide an economically and commercially attractive method of producing aliphatic and alicyclic carbonates in good yields.

Another object of the invention is to provide a method of producing aliphatic and/or alicyclic carbonates by the reaction of phosgene with aliphatic and/or alicyclic alcohols, wherein the reaction may be effectively controlled and executed in a continuous manner.

An additional object of the invention is to provide a method of producing aliphatic and alicyclic carbonates wherein phosgene is reacted with aliphatic and/or alicyclic alcohols in the vapor phase, thus making possible an efficient proportioning, mixing and contacting of the above reactants.

A further object of the invention is to provide a method of producing the above products wherein relatively simple and inexpensive equipment may be used to achieve large volume production.

Other objects and advantages will be apparent to those skilled in the art as the description of the invention unfolds.

To the accomplishment of the foregoing and related ends, the invention comprises the features hereinafter disclosed and particularly pointed out in the claims, the following description setting forth in detail some of the various forms in which the principle may be applied.

In accordance with the present invention, phosgene and aliphatic and/or alicyclic alcohols are reacted together, while substantially completely in the vapor phase, to form the corresponding carbonates, the reaction proceeding in accordance with the following equation:

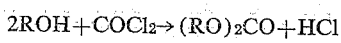

$$2ROH + COCl_2 \rightarrow (RO)_2CO + HCl$$

wherein R is an aliphatic or alicyclic radical.

For a more complete understanding of the present invention, reference is made to the following description of the apparatus and an illustrative example of the procedure used in practicing the vapor phase method of producing aliphatic and alicyclic carbonates.

The apparatus employed in the production of carbonates in accordance with the instant invention includes a graduated dropping funnel for feeding the liquid alcohols at a uniform rate through a vaporizer and then into the feed end of a tubular reactor. Also included is a flow meter for controlling the feed rate of phosgene which also enters the feed end of the tubular reactor. The alcohol vaporizer consists of an electrically heated preheater and a flash vaporizer heated in a molten salt-bath. The reactor is a section of Pyrex glass tubing (18 x 500 mm.), wound with Nichrome wire for electrical heating, having an effective reaction volume of about 95 cc. The phosgene inlet tube extends into the feed end of the reactor for a distance equal to about one-third of the reactor tube length. A thermowell enters the outlet end of the reactor tube and extends to a point which is about 1 inch from the tip of the phosgene inlet tube. An iron-constantan thermocouple is provided for measuring the temperature at any point in the reaction zone. A condenser for separating the carbonate from the gaseous reaction products is connected to the outlet end of the tubular reactor. The liquid products are collected in a cooled receiving-flask and the off-gases are discharged to an appropriate disposal system.

In the practice of the invention in the above apparatus, the alcohol is fed at a predetermined rate to the preheater and, after being heated to a temperature approximating its boiling point, is conducted to the vaporizer and instantly converted to the vapor state. Then the vapor is conveyed by the above-mentioned electrically heated tube to the reactor where it passes between the walls of the reactor and the outer surface of the phosgene inlet tube. Simultaneously with the introduction of alcohol vapor, phosgene is metered through the phosgene inlet tube at a rate so correlated with the alcohol feed rate as to supply the reactants in a phosgene/alcohol molar ratio of about 1:4. Moreover, the feed rates of the reactants are so correlated as to provide a reactant sojourn time within the range of about 3 to about 4 seconds.

The reaction temperature at the point of mixing of the reactants varies within the limits of about 85° C. to about 290° C. depending upon the alcohol employed. At a point further up the reaction tube, the reaction temperatures are 10° C. to 50° C. higher.

The vaporous reaction product comprising carbonate, hydrogen chloride, unconsumed reactants, etc. is conducted to a water-cooled condenser where the above product is separated into two fractions, namely, a crude liquid fraction and a vapor fraction. The crude liquid fraction containing carbonate is collected in the product receiver and the vapor fraction containing hydrogen chloride and unused reactants is discharged from the system to be treated with steam to render the phosgene innocuous.

The crude liquid fraction is then processed in the hereinafter described manner to separate the carbonate in a substantially pure form.

The invention is further illustrated but not limited by the following example.

Di-n-propyl carbonate

Phosgene and n-propyl alcohol are charged to the above reactor for 21 minutes at flow rates adjusted to supply the reactants in a $COCl_2$/propyl alcohol molar ratio of 0.26. During the reaction involving the consumption of 80 grams of propyl alcohol, the reactants are maintained at a temperature of from 180° C. to 200° C. and about 120 grams of a crude liquid product containing di-n-propyl carbonate is obtained.

The crude liquid product is distilled through an 8-in. helix packed column to separate an initial fraction containing unreacted alcohol boiling at 95° C.–98° C., an intermediate fraction boiling at 126° C.–162° C. and a final fraction boiling at 164° C. to 168° C. at atmospheric pressure. This last fraction consists of substantially pure di-n-propyl carbonate in an amount corresponding to about 69% of theory, basis n-propyl alcohol.

In a similar manner, dimethyl carbonate, diethyl carbonate, diisopropyl carbonate, diamyl carbonate, dioctyl carbonate, dicyclopentyl carbonate, di(methylcyclopentyl) carbonate, di(methylcyclohexyl) carbonate, and other aliphatic and alicyclic carbonates may be produced in good yields from phosgene and the corresponding alcohols.

The advantages of the vapor phase method of producing aliphatic and alicyclic carbonates over the liquid phase method of producing these products are strikingly demonstrated by comparing the reaction times which are required in the two cases to produce a given amount of diethyl carbonate.

For example in the practice of the liquid phase method of producing aliphatic carbonates described in the patent to Hammond (1,603,689), at least a 15-gallon (57 liters) reactor and a reaction time of about 25 hours are required to prepare 100 lbs. of diethyl carbonate, whereas, when using a 15-gallon vapor phase reactor, only 0.9 hour is required to prepare the same amount of this product. As evidence of the latter fact, reference is made to the following calculations:

(a) Pounds of $C_2H_5OH$ required to yield 100 pounds of $(C_2H_5O)_2CO$ assuming product yield of 70% of theory.   112 (2.44 lb. mols)
(b) Pounds of $COCl_2$ required to yield 100 pounds of $(C_2H_5O)_2CO$ assuming that a 20% excess of $COCl_2$ is employed.   124 (1.46 lb. mols)
(c) Total lb. mols: 2.44 lb. mols+1.46 lb. mols_____ 3.90 lb. mols
(d) Volume of reactants at 150° C. (423° K.)= 61,500 liters
$$\frac{3.9 \times 454 \times 423 \times 22.4}{273}$$
(e) Reaction time required to produce 100 pounds of $(C_2H_5O)_2CO$ in a 15 gallon (57 liters) reactor, with a sojourn time of 3 seconds.   0.9 hr.[1]

[1] This value is obtained by carrying out the following calculation:
$$\frac{61500 \times 3}{57 \times 60 \times 60}$$

These calculations show that when using a vapor phase reaction in the formation of aliphatic and alicyclic carbonates about 0.9 hour is required to produce 100 pounds of diethyl carbonate whereas in the liquid phase method about 25 hours are required to produce the same amount of product.

A further advantage of the vapor phase method of producing aliphatic and alicyclic carbonates over the liquid phase method is that the former is essentially a one step reaction, whereas in the latter a two stage reaction is involved in which chlorocarbonates are formed in one reactor and the corresponding carbonates are formed in an entirely different reactor.

A still further advantage of the vapor phase over the liquid phase method is that for a given production rate, the equipment required in the former is simpler and much less expensive than that required in the latter method. Thus, to produce 400 pounds per day of diethyl carbonate by the liquid phase method described in Patent 1,603,689 to Hammond would require a 100 gallon reactor for the conversion of chlorocarbonate to carbonate, whereas the vapor phase reactor would require a volume of only about 4 gallons.

The above described advantages of the vapor phase method, when taken together, show that it involves simpler and smaller equipment and fewer operational steps for a given production rate than the liquid phase method. Moreover, they show that, when using the same reactor volumes, the time required in the vapor phase reaction to produce a given amount of the desired product is about 1/25 of that required to yield the same amount of product by the liquid phase method. This combination of advantages demonstrates that the capital, labor and operating costs for a vapor phase plant are much less than those involved in a liquid phase plant and also that the vapor method constitutes a substantial advance in the art over the liquid phase method.

The various conditions of operation of the present method will now be considered in detail.

In the production of aliphatic and/or alicyclic carbonates, phosgene and a compound selected from the group consisting of primary and secondary aliphatic and alicyclic monohydric alcohols are reacted together while substantially completely in the vapor phase and in a phosgene/alcohol molar ratio of from 1:2 to 1:10 or, more specifically, from 1:2 to 1:4. Lower phosgene/alcohol molar ratios may be employed, but in the interest of economy and product purity it is preferred to adjust the reactants so as to provide substantially the stoichiometric proportions required to produce the carbonate.

The vapor phase reaction is applicable to alcohols of the above group which boil at atmospheric pressure without substantial decomposition and particularly to saturated aliphatic alcohols containing from 1 to 10 carbon atoms. The reaction is executed at a temperature above the boiling point of the alcohol but below the temperature at which substantial decomposition of the carbonate takes place during the time permitted for the reaction. More specifically, the reaction is carried out at a temperature substantially in the range of about 85° C. to about 350° C.

The reactants are fed to the reactor at rates providing a sojourn time in the range of from 1 to 20 seconds and preferably from 2 to 6 seconds.

The aliphatic and alicyclic carbonates are separated from the crude liquid condensate by distillation under atmospheric pressure and preferably under reduced pressure, which operation may or may not be preceded by treatment at room temperature with nitrogen or other inert gas to remove hydrogen chloride and unreacted phosgene. Other methods of separating the aliphatic and alicyclic carbonates from the crude liquid fraction may be used.

For example, the crude liquid product containing the above carbonates may be degassed with nitrogen, washed with dilute sodium bicarbonate solution to eliminate hydrogen chloride and unreacted phosgene and the resulting organic layer separated and dried to yield a relatively pure product.

As a further method of recovering the aliphatic and alicyclic carbonates, the crude liquid fraction may be scrubbed in a suitable tower, using an appropriate solvent such as pentane, hexane, benzene, toluene, etc. The carbonates are then separated from the extract by evaporating the solvent, and distilling, if desired.

The compounds prepared in accordance with the present invention may be used as solvents, plasticizers for organic film forming materials, pharmaceuticals, herbicides, insecticides and numerous other industrial purposes.

While the invention has been described with particular reference to specific embodiments, it is to be understood that it is not limited thereto but is to be construed broadly and restricted solely by the scope of the appended claims.

This application is a continuation-in-part of U. S. application Serial No. 228,526, filed May 26, 1951, and now abandoned.

What is claimed is:

1. The method of producing aliphatic and alicyclic carbonates, which comprises reacting together while substantially completely in the vapor phase, phosgene and a compound selected from the group consisting of unsubstituted primary and secondary aliphatic and alicyclic monohydric alcohols which boil at atmospheric pressure without substantial decomposition, said reactants being employed in a phosgene/alcohol molar ratio of from about 1:2 to about 1:10 and said reaction being carried out at a temperature above the boiling point of said alcohols but below the temperature at which substantial decomposition of said carbonates takes place during the time allowed for the reaction.

2. The method of producing alicyclic carbonates, which comprises reacting together while substantially completely in the vapor phase, phosgene and a compound selected from the group consisting of unsubstituted primary and secondary alicyclic monohydric alcohols boiling at atmospheric pressure without substantial decomposition, said reactants being employed in a phosgene/alcohol molar ratio of from about 1:2 to about 1:10 and said reaction being carried out at a temperature above the boiling point of said alcohols but below the temperature at which substantial decomposition of said carbonates takes place during the time allowed for the reaction.

3. The method of producing aliphatic carbonates, which comprises reacting together while substantially completely in the vapor phase, phosgene and a compound selected from the group consisting of unsubstituted primary and secondary aliphatic monohydric alcohols boiling at atmospheric pressure without substantial decomposition, said reactants being employed in a phosgene/alcohol molar ratio of from about 1:2 to about 1:10 and said reaction being carried out at a temperature above the boiling point of said alcohols but below the temperature at which substantial decomposition of said carbonates takes place during the time allowed for the reaction.

4. The method of producing aliphatic carbonates in accordance with claim 3 wherein the reaction is carried out at a temperature within the range of about 85° C. to about 350° C.

5. The method of producing aliphatic carbonates in accordance with claim 3 wherein the aliphatic alcohol contains 1 to 10 carbon atoms.

6. The method of producing aliphatic and alicyclic carbonates, which comprises reacting together while substantially completely in the vapor phase, phosgene and a compound selected from the group consisting of unsubstituted primary and secondary aliphatic and alicyclic monohydric alcohols boiling at atmospheric pressure without substantial decomposition, said reactants being employed in a phosgene/alcohol molar ratio of from about 1:2 to about 1:4 and said reaction being carried out at a temperature above the boiling point of said alcohols but below the temperature at which substantial decomposition of said carbonates taken place during the time allowed for the reaction.

7. The method of producing aliphatic carbonates, which comprises reacting together while substantially completely in the vapor phase, phosgene and a compound selected from the group consisting of unsubstituted primary and secondary aliphatic monohydric alcohols boiling at atmospheric pressure without substantial decomposition, said reactants being employed in a phosgene/alcohol molar ratio of from about 1:2 to about 1:4 and said reaction being carried out at a temperature above the boiling point of said alcohols but below the temperature at which substantial decomposition of said carbonates takes during the time allowed for the reaction.

8. The method of producing aliphatic carbonates in accordance with claim 7, wherein n-propyl alcohol is the alcohol employed.

9. The method of producing aliphatic and alicyclic carbonates, which comprises reacting together while substantially completely in the vapor phase, phosgene and a compound selected from the group consisting of unsubstituted primary and secondary aliphatic and alicyclic monohydric alcohols which boil at atmospheric pressure without substantial decomposition, said reaction being carried out in a sojourn time of about 1 to about 20 seconds and at a temperature above the boiling point of said alcohols but below the temperature at which substantial decomposition of said carbonates takes place, and said reactants being employed in substantially the stoichiometric proportions required to produce said carbonates.

10. The method of producing aliphatic and alicyclic carbonates, which comprises reacting together while substantially completely in the vapor phase, phosgene and a compound selected from the group consisting of unsubstituted primary and secondary aliphatic and alicyclic monohydric alcohols which boil at atmospheric pressure without substantial decomposition, said reaction being carried out in a sojourn time of about 2 to about 6 seconds and at a temperature above the boiling point of said alcohols but below the temperature at which substantial decomposition of said carbonates takes place, and said reactants being employed in substantially the stoichiometric proportions required to produce said carbonates.

References Cited in the file of this patent

UNITED STATES PATENTS

| | | |
|---|---|---|
| 1,603,689 | Hammond | Oct. 19, 1926 |
| 1,618,824 | Hammond | Feb. 22, 1927 |